Dec. 29, 1959 W. L. HUNTER ET AL 2,919,415
AMPLITUDE MODULATED BLOCKING OSCILLATORS OR THE LIKE
Filed March 22, 1954
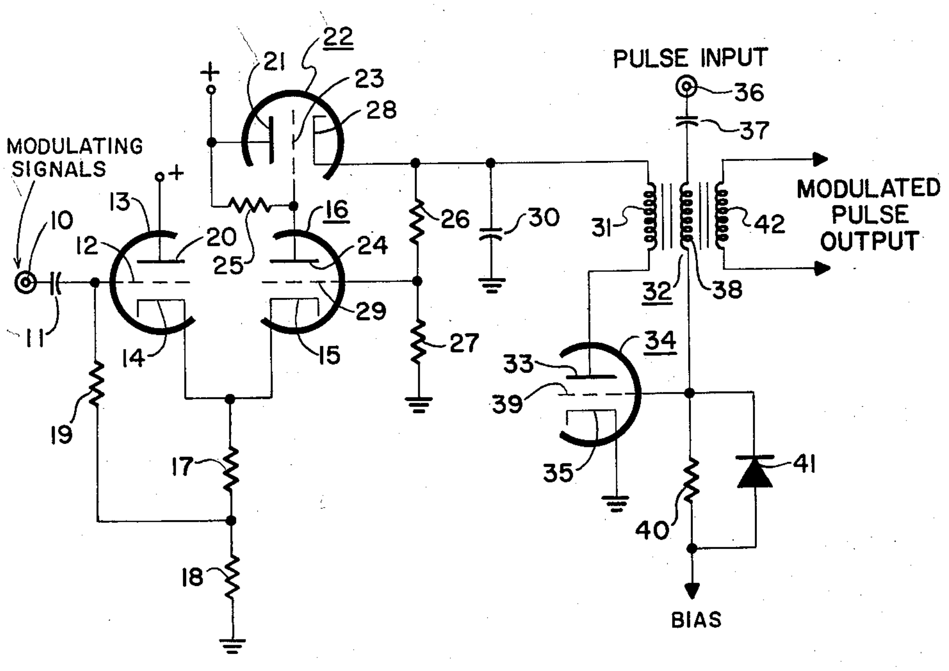
WILMONT L. HUNTER
RICHARD L. ROPA
*INVENTORS*
*BY* [signature]
THEIR ATTORNEY

United States Patent Office 2,919,415

Patented Dec. 29, 1959

2,919,415

AMPLITUDE MODULATED BLOCKING OSCILLATORS OR THE LIKE

Wilmont L. Hunter, Los Angeles, and Richard L. Ropa, Canoga Park, Calif., assignors to Hoffman Electronics Corporation, a corporation of California Application March 22, 1954, Serial No. 417,628

4 Claims. (Cl. 332—14)

This invention is related to improvements in modulated oscillator circuitry and, more specifically, to improved circuitry for accomplishing amplitude modulation of a pulse generator.

In the past, many efforts have been made to effect pulse amplitude modulation. These attempts have utilized various techniques including the use of a pentode pulse amplifier with a modulating signal applied to the screen grid of the amplifier pentode. Such attempts have always met with certain difficulties, i.e., in connection with the modulation pulse amplifier utilizing a pentode, the high internal impedance limits the pulse power derivable.

Therefore, it is an object of this invention to provide a simple but effective method for deriving amplitude modulated pulses at relatively high power levels.

It is a further object of this invention to provide circuitry for effecting amplitude modulation of the output pulse from a blocking oscillator.

According to this invention, amplitude modulation of the pulse output from a blocking oscillator is accomplished by modulating the plate current flowing to the blocking oscillator tube. Because the blocking oscillator operates in essentially a Class "C" condition, relatively high power output can be maintained while accomplishing the desired amplitude modulation. By utilizing a large degree of negative feed-back in the modulating stages, an extremely small amount of phase shift occurs in the modulating signal.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

The single figure is a schematic diagram showing the circuitry of an amplitude modulated pulse generator according to the present invention.

In the figure modulating signals from an appropriate source are coupled from input terminal 10 through condenser 11 to grid 12 of triode 13 which acts as an input amplifier stage. Cathode 14 of triode 13 is coupled directly to cathode 15 of triode 16 and through a pair of series connected cathode load resistors 17 and 18 to ground or reference potential. Grid resistor 19 is connected between grid 12 and the common junction between resistors 17 and 18, anode 20 of triode section 13 is connected directly to a source of anode operating potential, not shown.

Anode 21 of triode section 22 is connected directly to a source of anode operating potential, not shown, and grid 23 of that triode is connected directly to anode 24 of triode section 16. Grid 23 is also coupled through a resistor 25 to anode 21 of triode 22. Series connected resistors 26 and 27 are connected between cathode 28 of triode section 22 and ground or reference potential and the common junction of resistors 26 and 27 is connected to grid 29 of triode section 16. Storage condenser 30 is connected between cathode 28 of triode 23 and ground potential. Cathode 28 is connected through winding 31 of blocking oscillator transformer 32 to anode 33 of triode section 34. Cathode 35 of that triode is connected directly to ground potential. Trigger pulses for controlling the time of firing of the blocking oscillator including triode 34 are inserted at trigger input terminal 36 and are coupled through condenser 37 and winding 38 of blocking oscillator transformer 32 to grid 39 of triode 34. That grid is coupled to a source of biasing potential, not shown, through resistor 40 which may be shunted by diode 41 to hasten the recovery time of the blocking oscillator. Modulated output pulses are taken from winding 42 of blocking oscillator transformer 32.

The circuit of Figure 1 operates as follows. Modulating signals are impresesd upon the cathode of triode section 16 which is half of a differential amplifier including triode sections 16 and 22. The function of triode section 13 is that of a cathode follower to permit the driving of triode section 16 from a high impedance modulating signal source. As a result of the large negative feed-back occurring between cathode 28 of triode section 22 and grid 29 of triode section 16, the output impedance at cathode 28 is in the order of a few ohms so that the use of storage condenser 30 does not result in an appreciable shift in the phase of the audio modulating voltage superimposed on the D.C. voltage applied to anode 33 of triode section 34 in the blocking oscillator. The upper frequency limit for the modulating voltage is determined by the values of storage condenser 30 and resistors 26 and 27 through which condenser 30 discharges during the negative portion of the modulating signal. When a positive triggering pulse is applied to trigger input terminal 36 the blocking oscillator, including triode section 34 and blocking oscillator transformer 32, functions as a normal blocking oscillator and the current flowing to anode 33, part of which is supplied from condenser 30, reaches a high order of magnitude. Although this condenser supplies most of the anode current for triode section 34 during the pulse, the capacity is suffifficiently large that the voltage across condenser 30 changes only by a small amount during the pulse. This condenser is recharged between pulses by current flowing from triode 22. The pulse width is determined by the value of condenser 37 and the characteristics of blocking oscillator transformer 32. The average output pulse amplitude of the system is determined by the average D.C. voltage appearing across condenser 30, which is in turn, determined by the values of resistors 26 and 27. Diode 41 may be added to hasten the discharge of condenser 37 and reduce the recovery time of the circuit.

Purely by way of example, the components of the circuit shown in Figure 1 may have the following values:

| | |
|---|---|
| Resistor 19 | 470,000 ohms. |
| Resistor 17 | 6,800 ohms. |
| Resistor 18 | 43,000 ohms. |
| Resistor 25 | 470,000 ohms. |
| Resistor 26 | 68,000 ohms. |
| Resistor 27 | 22,000 ohms. |
| Resistor 40 | 56,000 ohms. |
| Condenser 11 | 0.1 microfarad. |
| Condenser 30 | 0.047 microfarad. |
| Condenser 37 | 220 micro-microfarads. |
| Triode sections 13, 16, 22 and 34 | Each one-half of 12AU7. |
| Transformer 32 | Westinghouse type 7P7. |
| Diode 41 | 1N70. |
| Voltage on anode 20 of section 13 | 150 volts. |
| Voltage on anode 21 of triode 22 | 250 volts. |
| Bias voltage applied to grid 29 of triode 34 | —30 volts. |

With a circuit comprising the foregoing components operating at indicated voltages, and utilizing triggering pulses having amplitudes of 50 volts, widths of 3 microseconds and a repetition note of 7,200 pulses per second, the spacing being random but not less than 12 microseconds, the pulses appearing across winding 42 of transformer 32 will have a width of 1 microsecond and an average amplitude of 150 volts, modulated 25% in amplitude with less than 1° of phase shift in the modulating voltage.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. An amplitude modulated blocking oscillator circuit comprising a blocking oscillator electron discharge device having anode, cathode and control electrodes, a signal modulated voltage supply source for said anode electrode comprising an amplifier having anode, cathode and control electrodes, a source of signals coupled to the cathode and control electrodes of said amplifier, a signal output circuit coupled to the amplifier anode, a second electron discharge device having anode, cathode and control electrodes, means for applying the signals from said output circuit to the control and cathode electrodes of the second device, a voltage supply source connected to the anodes of the amplifier and of the second device, a negative feedback path for the signals from the output of the second discharge device to the amplifier including a resistance in the anode-cathode current path of the second discharge device across which the output signals appear, a storage condenser connected across said resistance, direct current coupling means applying the voltage across said resistance to the anode of said blocking oscillator electron discharge device, said blocking oscillator discharge device having components interconnecting its electrodes for producing spaced pulses of short duration having respective amplitudes varying in accordance with the variations in amplitude of the voltage across the condenser.

2. An amplitude modulated blocking oscillator comprising an electron discharge device having anode, cathode and control electrodes, a signal modulated voltage supply source for said anode electrode comprising an amplifier having anode, cathode and control electrodes, a source of signals coupled to the cathode and control electrodes, a signal output circuit coupled to the amplifier anode, a second electron discharge device having anode, cathode and control electrodes, means for applying the signals from the output circuit to the control and cathode electrodes of the second device, a voltage supply source connected to the anodes of the amplifier and second device, a negative feedback path for the signals from the output of the second discharge device to the amplifier including a resistance in the anode-cathode current path of the second discharge device across which the output signals appear, a storage condenser connected across said resistance, a transformer having an end of one winding connected to the anode electrode of the blocking oscillator discharge device and its other end connected to the resistance to apply the voltage thereacross to the anode electrode of the blocking oscillator discharge device, and a second winding coupling another electrode of the blocking oscillator discharge device to the first winding for rendering the blocking oscillator operative to produce spaced pulses respectively varying in amplitude in accordance with the variations in amplitude of the voltage across the resistor.

3. An amplitude modulated blocking oscillator circuit in accordance with claim 2 in which a source of triggering pulses is coupled to the second winding to pulse the blocking oscillator.

4. An amplitude modulated blocking oscillator comprising an electron discharge device having anode, cathode and control electrodes, a signal modulated voltage supply source for said anode electrode comprising an amplifier having anode, cathode and control electrodes, a source of signals coupled to the cathode and control electrodes, a signal output circuit coupled to the amplifier anode, a second electron discharge device having anode, cathode and control electrodes, means for applying the signals from the output circuit to the control and cathode electrodes of the second device, a voltage supply source connected to the anodes of the amplifier and second device, a negative feedback path for the signals from the output of the second discharge device to the amplifier including a resistance in the anode-cathode current path of the second discharge device across which the output signals appear, a storage condenser connected across said resistance, a transformer having an end of one winding connected to the anode electrode of the blocking oscillator discharge device and its other end connected to the resistance to apply the voltage thereacross to the anode electrode of the blocking oscillator discharge device, a second winding having one end connected to the grid of the blocking oscillator discharge device and the other end coupled through a series capacitance to a source of triggering impulses to render the blocking oscillator operative to produce spaced narrow pulses respectively varying in amplitude in accordance with the variations in amplitude of the voltage across the resistor, and an output winding on the transformer for delivering the spaced amplitude modulated pulses.

References Cited in the file of this patent

UNITED STATES PATENTS

| | | |
|---|---|---|
| 2,091,546 | Hruska | Aug. 31, 1937 |
| 2,458,574 | Dow | Jan. 11, 1949 |
| 2,497,411 | Krumhansl | Feb. 14, 1950 |
| 2,572,016 | Elbourn | Oct. 23, 1951 |
| 2,577,522 | Hite et al. | Dec. 4, 1951 |
| 2,623,954 | Van Zelst | Dec. 30, 1952 |
| 2,632,853 | Lindley et al. | Mar. 24, 1953 |
| 2,662,197 | Comte | Dec. 8, 1953 |
| 2,798,155 | Valeton | July 2, 1957 |

OTHER REFERENCES

"Blocking Oscillator Amplitude Control" (Electronic Engineering), November 1951, page 439.